March 1, 1932.　　　D. DAVIES　　　1,847,819
HAIRPIN HOOK
Filed April 1, 1931　　　2 Sheets-Sheet 2

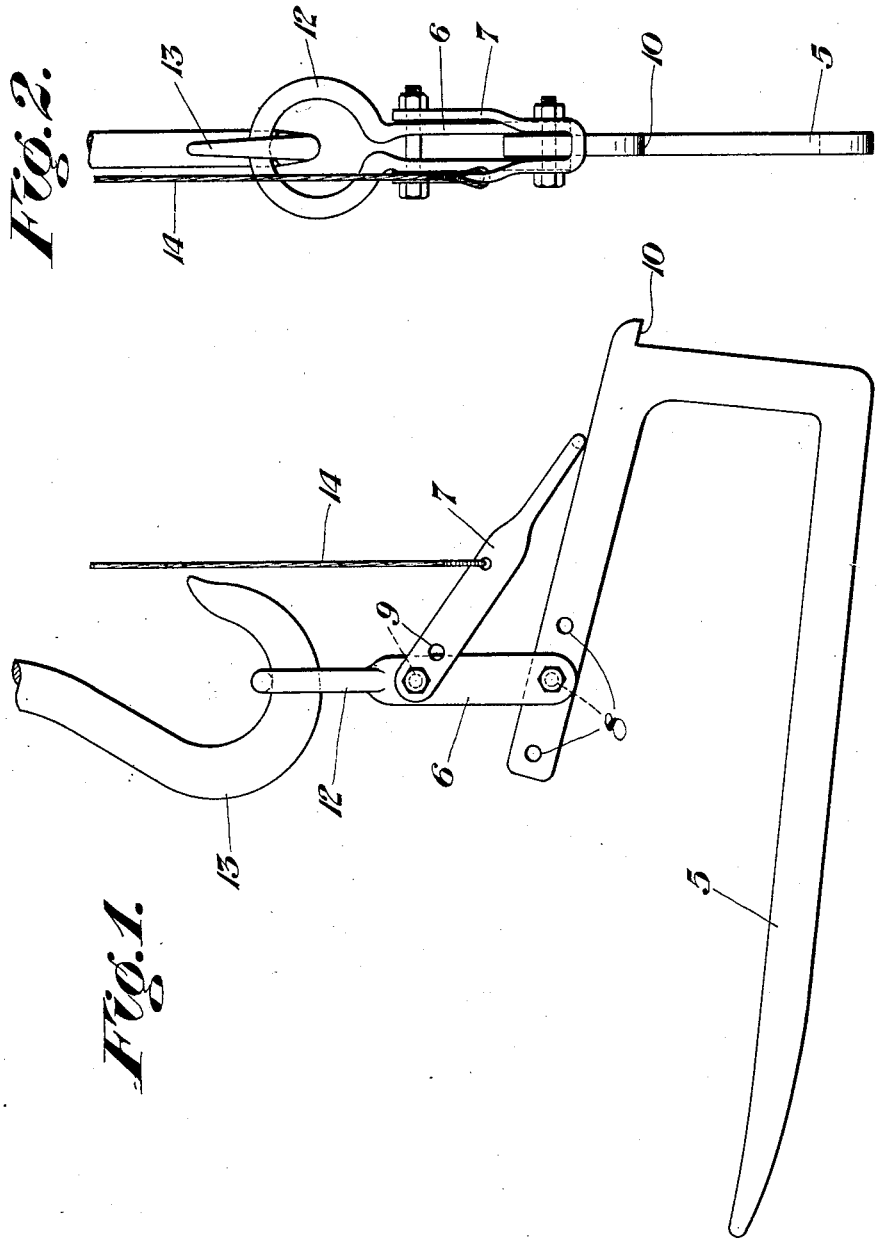

Inventor:
DAVID DAVIES,
by: Usina & Rauber
his Attorneys

Patented Mar. 1, 1932

1,847,819

UNITED STATES PATENT OFFICE

DAVID DAVIES, OF CLEVELAND, OHIO, ASSIGNOR TO THE AMERICAN STEEL AND WIRE COMPANY, OF NEW JERSEY, A CORPORATION OF NEW JERSEY

HAIRPIN HOOK

Application filed April 1, 1931. Serial No. 527,016.

This invention relates to rod hooks or what are commonly termed "hairpin hooks" in steel and wire mill practice and which are particularly adapted for picking up and transporting round bundles of wire or rod and like cylindrical or hollow products.

While the improved hook has been designed for use with any type of carrier, it is particularly adapted for traveling carriers of the overhead crane type.

The principal object of the invention is to provide a device of the class specified which is simple yet durable in construction and is comprised of parts which may be easily manufactured and assembled in operative relation, and which may be readily operated to receive and discharge its load.

With the foregoing and other objects and advantages in view, the invention consists in the preferred construction and arrangement of the several parts which will be more fully hereinafter described and claimed.

In the drawings:

Figure 1 is a view in side elevation of the improved hook in carrying position.

Figure 2 is a rear end elevation.

Figure 3:
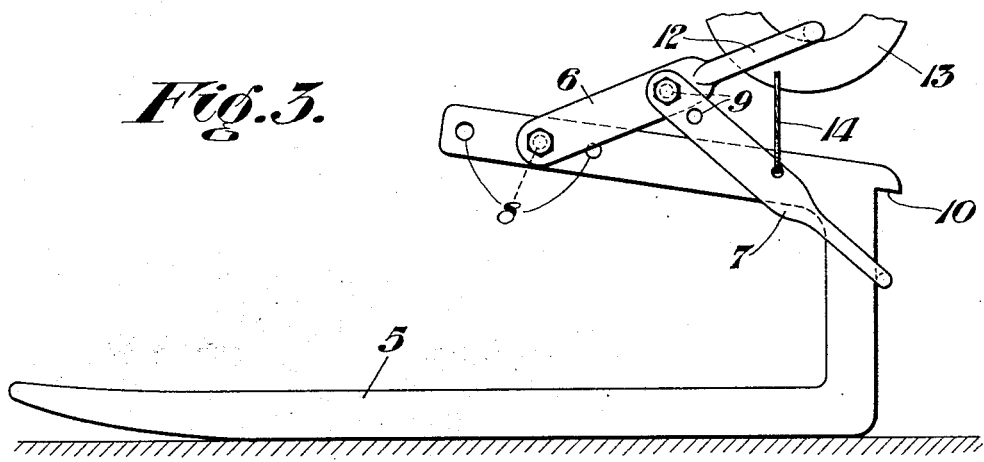
Figure 3 is a side elevation showing the hook in its intermediate or rest position.
Figure 4:
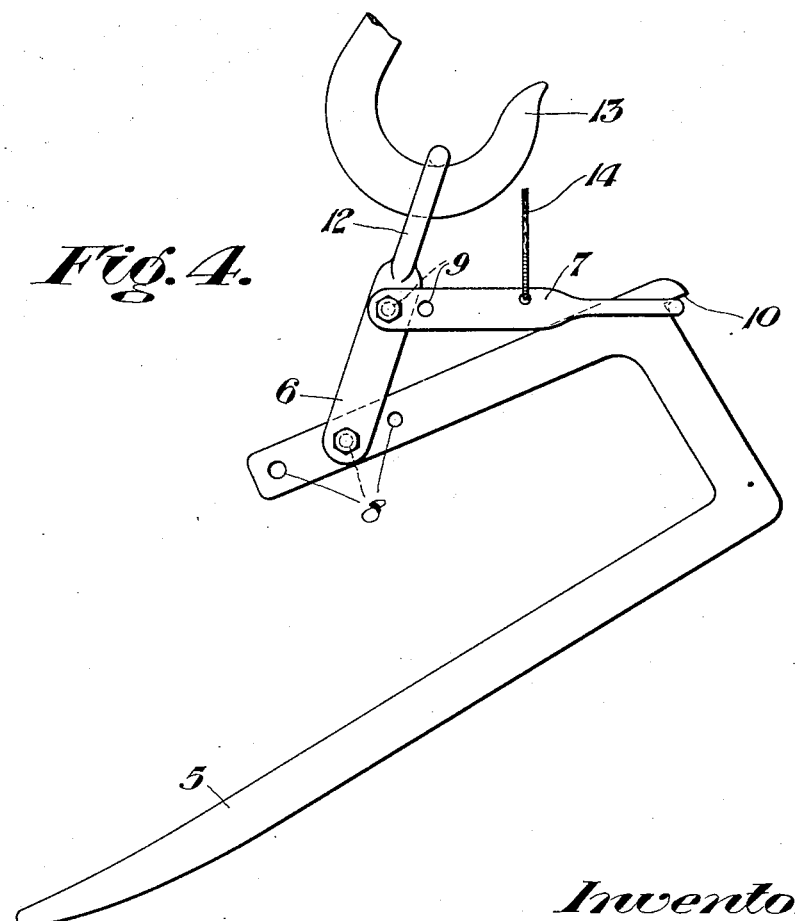
Figure 4 is a similar view showing the hook in discharging position.

The hook is extremely simple in construction and, as will be noted, preferably comprises but three main parts, namely, the hook 5, hanger 6 and strap or latch 7.

The hook 5 is substantially U-shaped and formed with a plurality of pivoting holes 8, by means of which it may be adjustably pivoted to the hanger 6, and the strap or latch 7 is also formed with a plurality of similar holes 9 whereby it may be adjustably pivoted at one extremity to the said hanger. The opposite extremity of the strap 7 is adapted to engage over a shoulder or lug 10 formed on the hook 5 when in charging and discharging position.

The hanger 6 is provided with an eye 12 adapted to receive the crane hook, indicated at 13, and a trip cord or cable 14 is attached at one end to the strap or latch 7, said cord being located at a point within convenient reach of an operator, as in the cab of an overhead crane.

In the position shown in Figure 1, the hook 5 is assumed to be carrying a load of hollow objects such as bundles of wire or rod. When the load is lowered, the hanger 6 naturally falls toward the lug 10 and the hook assumes a resting position with its prong more to the horizontal so that the strap or latch 7 falls over the lug 10 and rests against the rear side of the hook therebelow. When the crane operator raises the crane hook 13 to discharge the load, the hanger 6 pulls the strap or latch up against the shoulder or lug 10, thereby drawing the rear end of the hook up to an inclined position, and the hook pulls back out of the load. The hook is now also in charging position, its charging and discharging positions being similar.

To load the hook after it is in charging position, the operator slips it into a load of wire or rod bundles, for example, with a downward and forward motion of the crane cable or chain. This places the hook 5 in an intermediate position, and the operator then pulls the trip cord 14 and thus lifts the strap or latch 7 over the shoulder or lug 10. The load is then lifted and the hook assumes its balanced carrying position as shown in full lines in Fig. 1.

The hanger 6 and latch 7 may be made of ordinary strap iron and bent into shape, and the general simplicity in construction and operation of the improved hook will be obvious to those having a knowledge of the art.

What is claimed as new is:—

1. A work handling device comprising a substantially U-shaped hook having one long prong for engaging and supporting the work and a short prong for connection with a lifting and transporting element, said short prong being inclined downwardly toward the back of the hook, a hanger pivotally secured to said short prong adjacent its outer end and adapted to be engaged with the lifting element, a U-shaped latch member having its upper end pivotally secured to said hanger and adapted to have its closed end resting on the upper inclined surface of said short leg when said hook is in load carrying position, a lug formed integral with the back of said hook adjacent its upper end and adapted to be automatically engaged by the closed end of said latch when said hook is lowered onto a stationary object so that said hanger and latch may move downwardly relative to said hook, and a trip cord secured to said latch by which said latch may be manually returned to unlatched position.

2. A work handling device comprising a substantially U-shaped hook having one long prong for engaging and supporting the work and a short prong for connection with a lifting and transporting element, said short prong being inclined downwardly toward the back of the hook, a hanger pivotally secured to said short prong adjacent its outer end and adapted to be engaged with the lifting element, a latch member pivotally secured to said hanger and adapted to have its latch end resting on the upper inclined surface of said short leg when said hook assembly is in load carrying position, a lug formed integral with the back of said hook and adapted to be automatically engaged by said latch when said hook is lowered onto a stationary object so that said hanger and latch may move downwardly relative to said hook, and a trip cord secured to said latch by which said latch may be manually returned to unlatched position.

In testimony whereof, I have hereunto set my hand.

DAVID DAVIES.